(12) United States Patent
Chung

(10) Patent No.: US 7,006,519 B2
(45) Date of Patent: Feb. 28, 2006

(54) APPARATUS AND METHOD OF TRANSMITTING OR RECEIVING DATA PACKETS IN A WDM BASED NETWORK SYSTEM

(75) Inventor: Jee Hoon Chung, Songnam-shi (KR)

(73) Assignee: LG Electronics Inc., Seoul (KR)

( * ) Notice: Subject to any disclaimer, the term of this patent is extended or adjusted under 35 U.S.C. 154(b) by 938 days.

(21) Appl. No.: 10/026,774

(22) Filed: Dec. 27, 2001

(65) Prior Publication Data

US 2002/0085580 A1 Jul. 4, 2002

(30) Foreign Application Priority Data

Dec. 28, 2000 (KR) .............................. P2000-84707

(51) Int. Cl.
*H04L 12/42* (2006.01)
(52) U.S. Cl. ...................................... 370/458; 370/321
(58) Field of Classification Search ................ 370/314, 370/321, 336, 337, 347, 431, 442, 458, 464, 370/322, 326, 329, 341, 345, 349, 389, 395.42
See application file for complete search history.

(56) References Cited

U.S. PATENT DOCUMENTS 5,864,414 A * 1/1999 Barnsley et al. .............. 398/71
6,718,080 B1 * 4/2004 Ofek et al. ................... 385/15

* cited by examiner

*Primary Examiner*—Brenda Pham
(74) *Attorney, Agent, or Firm*—Fleshner & Kim, LLP

(57) ABSTRACT

An apparatus and a method of transmitting a normal packet from a transmitting node in a Wavelength Division Multiplexing (WDM) based network system are included. Using the apparatus and method in accordance with the present invention, the WDM based network system is able to avoid any collisions between the packets that are already loaded into the mini slots and the packets that are about to be loaded into the mini slots. Therefore, the defects of the synchronous packet transmitting/receiving method are eliminated. The packet-receiving channel of the packet-receiving node can be set to a fixed wavelength; consequently, the problems of the related art techniques are solved. In conclusion, the efficiency of the whole network system is greatly enhanced.

14 Claims, 3 Drawing Sheets

APPARATUS AND METHOD OF TRANSMITTING OR RECEIVING DATA PACKETS IN A WDM BASED NETWORK SYSTEM

This application claims the benefit of the Korean Application No. P2000-84707 filed on Dec. 28, 2000, which is hereby incorporated by reference.

BACKGROUND OF THE INVENTION

1. Field of the Invention

The present invention relates to a network system, and more particularly, to a method of transmitting or receiving one or more data packet in a Wavelength Division Multiplexing (WDM) based network system.

2. Discussion of the Related Art

As the current network technology based on an optical cable is widely used in many engineering fields, various methods of optimizing the signal transmission bandwidth of the optical cable are currently being aggressively researched. Some of the examples are Time Division Multiplexing (TDM), Code Division Multiplexing (CDM), and Wavelength Division Multiplexing (WDM) techniques.

Among the methods mentioned above, the WDM technique deserves considerable attention because it is able to maximize the transmission bandwidth of the optical cable without having any drastic improvements of the existing electrical systems. The network system employing the WDM technique initially modulates each signal to a signal having a particular wavelength and transmits each modulated signals through an optical cable line.

FIG. 1 illustrates a network system employing the WDM method according to the related art. As shown in the figure, the system includes a star coupler 20 and a plurality of nodes 10. Each node includes a Wave Tunable Transmitter (hereinafter, "WTT) 31, a Wave Fixed Transmitter (hereinafter, "WFT") 32, a Wave Tunable Receiver (hereinafter, "WTR") 33, and a Wave Fixed Receiver (WFR) 34.

Each node of the network system employing the WDM technique transmits or receives a data packet to or from another in an asynchronous way. For example, if the node-A 13 desires to send a data packet to the node-C 11, the WTT 31 of the node-A 13 initially sends the wave information of the node-A 13 to the WFR 34 of the node-C 11.

Then the WTR 33 of the node-C 11 adjusts its packet-receiving channel in accordance with the wave information received. When the packet-receiving channel of the node-C 11 accords to the wave information of the node-A 13, the WFT 32 of the node-A 13 finally sends the data packet to the node-C 11.

In a case where the node-A 13 alone sends a packet to the node-C 11, the node-A is able to complete its packet transmission without any problem. However, if another node (e.g., node-B 12) has started to send a packet to the node-C 11 before the node-A 13 does, the WTR 33 of the node-C 11 adjusts its packet-receiving channel in accordance with the wavelength information given by the node-B 12. Therefore, the node-A 13 may not be able to access to the packet-receiving channel of the node-C 11. This results the lower efficiency of the whole network system.

In order to overcome the problem described above, each node of the system may transmits/receives a packet to/from another node using a synchronous process instead, in which the packet-receiving channel of a receiving node can be fixed.

However, this may cause another problem. In a case where a transmitting node having a first packet-receiving channel sends a normal packet to a receiving node having a second packet-receiving channel, one or more packets being unloaded from the first packet-receiving channel may collide with the normal packet being loaded into the second packet-receiving channel.

SUMMARY OF THE INVENTION

Accordingly, the present invention is directed to a method of transmitting/receiving one or more data packets in a network system using a WDM method that substantially obviates one or more problems due to limitations and disadvantages of the related art.

An object of the present invention is to provide a method of transmitting/receiving one or more data packets in a network system that prevents the collisions between the packets being unloaded from the packet-receiving channel of a transmitting node and the normal packet being loaded into packet-receiving channel of a receiving node.

Another object of the present invention is to provide a method of transmitting/receiving one or more data packets in a network system, in which the packet transmitting/receiving processes of the nodes are unified to a synchronous process so that the packet-receiving channel of each node may be tuned to a given wavelength.

Another object of the present invention is to provide a method of transmitting/receiving one or more data packets in a network system that elevates the efficiency of the entire network system by eliminating the transmission interfering problems resulted from not being able to tune the packets to the packet-receiving channel of the receiving node.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a normal packet in a network system is disclosed, where the system includes a transmitting node having a first packet-receiving channel and a receiving node having a second packet-receiving node.

The method includes the steps of detecting a first set of unoccupied mini slots that flow in the second channel, detecting a second set of mini slots that flow in the first channel, and checking a destination address of each incoming packet loaded into the second set of mini slots.

The method further includes the steps of receiving each regular packet from the second set of mini slots, the each regular packet having its destination address is set to the transmitting node, receiving each priority packet from the second set of mini slots, each priority packet having its destination address is set to a node other than the transmitting node, temporarily storing each priority packet in a priority storage, and transmitting the normal packet to the receiving node by loading the normal packet into the first set of unoccupied mini slots.

Finally, the method includes the step of transmitting each priority packet stored in the priority storage by loading each priority packet into a third set of mini slots that flow in the first channel.

In another aspect of the present invention, an apparatus of transmitting a normal packet from a transmitting node having a first packet-receiving channel in a network system is disclosed.

The apparatus includes a Wavelength Tunable Receiver (WTR) detecting a first set of unoccupied mini slots that flow in a second packet-receiving channel of a receiving node and a Wavelength Fixed Receiver (WFR) checking a destination address of each of incoming packets loaded into a second set of mini slots that flow in the first channel. The incoming packets include at least one priority packet whose destination address is set to the transmitting node.

The apparatus further includes a priority storage temporarily storing the priority packet and a Wavelength Tunable Transmitter (WTT) transmitting the normal packet to the receiving node by loading the normal packet into the first set of unoccupied mini slots. The WTT further transmits the priority packet stored in the priority storage by lading the packet into a third set of mini slots that flow in the first channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
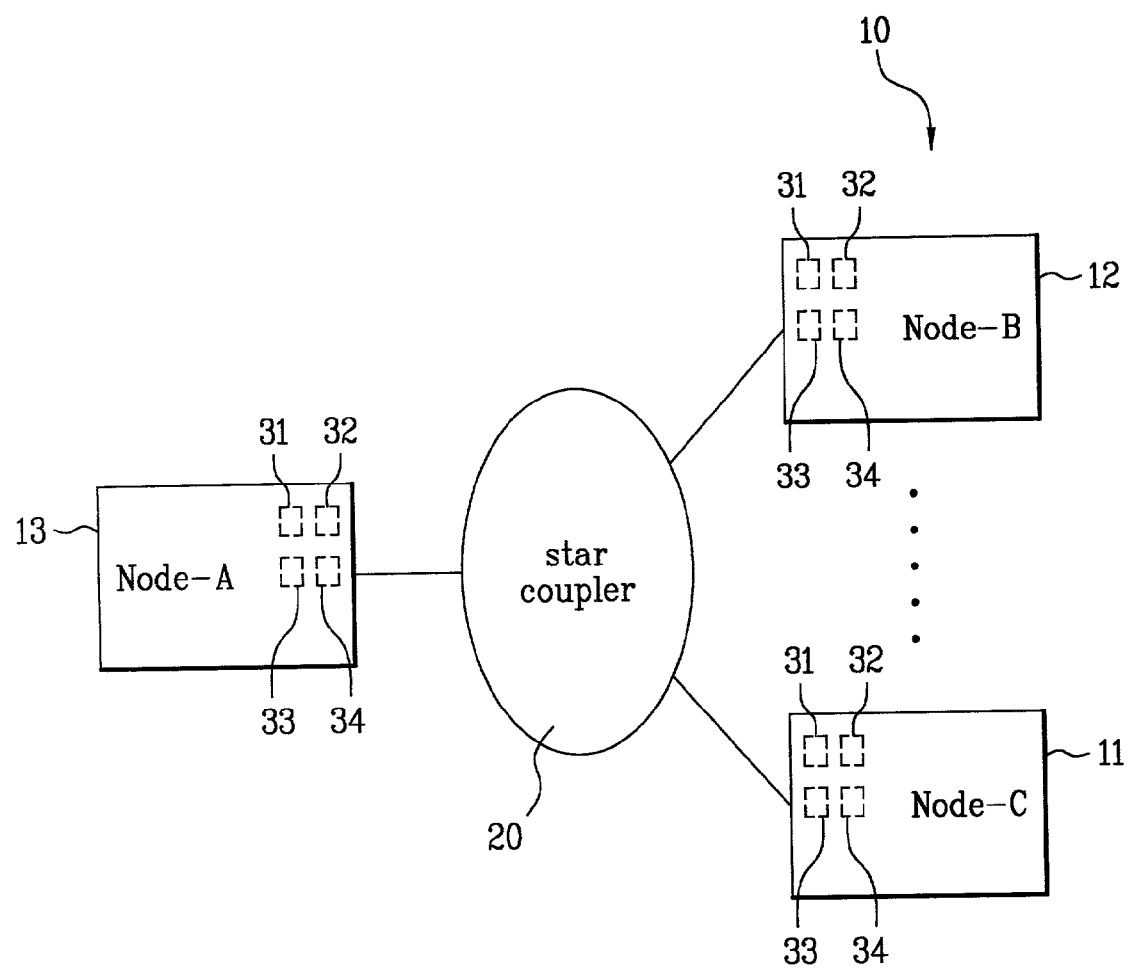
FIG. 1 illustrates an existing WDM based network system according to the related art.
Figure 2:
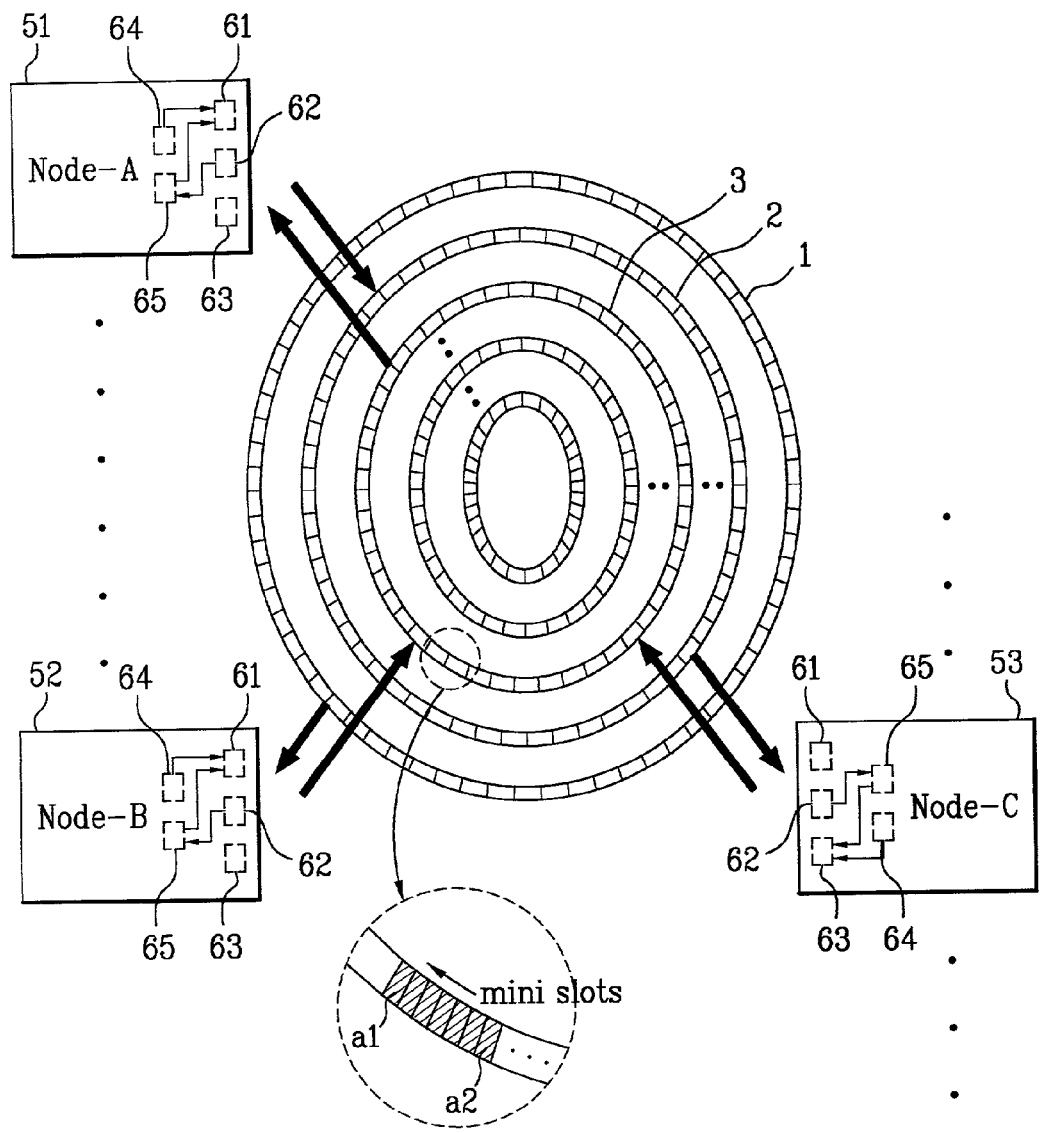
FIG. 2 illustrates an apparatus of transmitting a normal packet in a node included in a WDM based network system according to the present invention.

FIG. 2 illustrates a Wavelength Division Multiplexing (WDM) based network system according to the present invention. As shown in the figure, the network system includes a plurality of channels (1, 2, 3, and so on) arranged in a ring shape and a plurality of nodes (51, 52, 53, and so on), each of which forms a network system with another using one or more channels. In each of the plurality of channels, one or more sets of mini slots continuously flow in order to transport one or more data packets.

In the network system according to the present invention, each node may transmit or receive one or more packets by using a synchronous method. Therefore, each node may have a fixed packet-receiving channel. For example, the node-A 51 may use the channel 3 as its fixed packet-receiving channel, and the node-B 52 may use the channel 1 as its fixed packet-receiving channel. Similarly, the node-C 53 may use the channel 2 as its fixed packet-receiving channel.

In addition, each node includes a Wavelength Tunable Transmitter (hereinafter, "WTT") 61, a Wavelength Tunable Receiver (hereinafter, "WTR") 63, a Wavelength Fixed Receiver (hereinafter, "WFR") 62, a storage 64 and a priority storage 65.

The storage 64 included in a transmitting node stores a normal packet, which is subject to be transmitted to a receiving node.

The WTT 61 included in a transmitting node tunes the normal packet stored in the storage 64 in accordance with the wavelength of the packet-receiving channel of the receiving node. Thereafter, the WTT 61 transmits the tuned normal packet to the receiving node by loading the tuned packet into the mini slots that flow in the packet-receiving channel of the receiving node.

For example, let's assume that the node-B 52 and the node-A 51 are a transmitting node and a receiving node, respectively. First, the WTT 61 of the node-B 52 tunes a normal packet stored in the storage 64 of the node-B 52 in accordance with the wavelength of the channel 3, which is the packet-receiving channel of the node-A 51. Then the WTT 61 of the node-B 52 transmits the tuned normal packet to the node-A 51.

The WTR 63 included in a transmitting node detects any unoccupied (empty) mini slots among many mini slots continuously flowing in the packet-receiving channel of a receiving node.

Let's assume once again that the node-B 52 and the node-A 51 correspond to a transmitting node and a receiving node, respectively. Then the WTR 63 of the node-B 52 detects a set of unoccupied (empty) mini slots that continuously flow in the channel 3, which is the packet-receiving channel of the node-A 51.

In addition, the WFR 62 of a node receives one or more packets loaded in a set of mini slots continuously flowing in the packet-receiving channel of the node. For example, the WFR 62 included in the node-B 52 receives the packets loaded in a set of mini slots continuously flowing in the channel 1, which is a fixed packet-receiving channel of the node-B 52.

When the WFR 62 of a node receives one or more packets by unloading them from the packet-receiving channel of the node, the priority storage 65 included in the node is able to temporarily receive and store not only the packets whose destination addresses are set to the node itself but also the packets whose destination addresses are not set to the node. That's because the priority storage 65 has an enough storage space.

For example, when the WFR 62 of the node-B 52 receives incoming packets by unloading them from the channel 1, the priority storage 65 included in the node-B 52 is able to receive both of the packets whose destination addresses are set to the node-B 52 and the packets whose destination addresses are set to another node.

Consequently, the WFR 62 of the node-B 52 is able to receive and store the packets whose destination address are set to the node-B 52 or any other node using the priority storage 65. For that reason, the mini slots that pass by the WFR 62 and flow to the WTT 61 can maintain their states of being unoccupied (empty).

As a result, the collisions that can be occurred between the packets being unloaded from a set of mini slots flowing in the packet-receiving channel of a transmitting node and the one or more normal packets being loaded into another set of mini slots flowing in the packet-receiving channel of a receiving node can be prevented in advance.

The packets being unloaded from the first set of mini slots represent the priority packets stored in the priority storage in the priority storage 65, and the packets required to be loaded into the mini slots of the packet-receiving channel of the receiving node represent the normal packets stored in the storage 64.

As described above, each node of the network system shown in FIG. 2 is able to send/receive one or more data packets in a synchronous manner without any collision between the packets. Therefore, a packet-receiving node (node-A 51) of the system can use a given channel as its fixed packet-receiving channel, and a packet-transmitting node of the system (node-B 52 or node-C 53) may transmit one or more packets through the fixed packet-receiving channel.

Furthermore, the WTT 61 of the node-B 52 does not need to perform a process of sending wavelength information any more. It simply tunes the packets being transmitted and transmits the tuned packets to the channel 3.

Similarly, the WTT 61 of the node-C 63 does not need to perform a process of sending wavelength information. It can simply complete its packet transmission process by tuning the wavelengths of the packets to the channel 3 and transmitting the tuned packets to the channel 3.

As a result, the node-B 52 and the node-C 53 may send one or more data packets simultaneously to the node-A 51 and can complete their packets transmission processes. Since each node of the network system according to the present invention may transmit a packet to another in a synchronous manner, the packet-receiving channel of each node may be set to a fixed wavelength.

Figure 3:
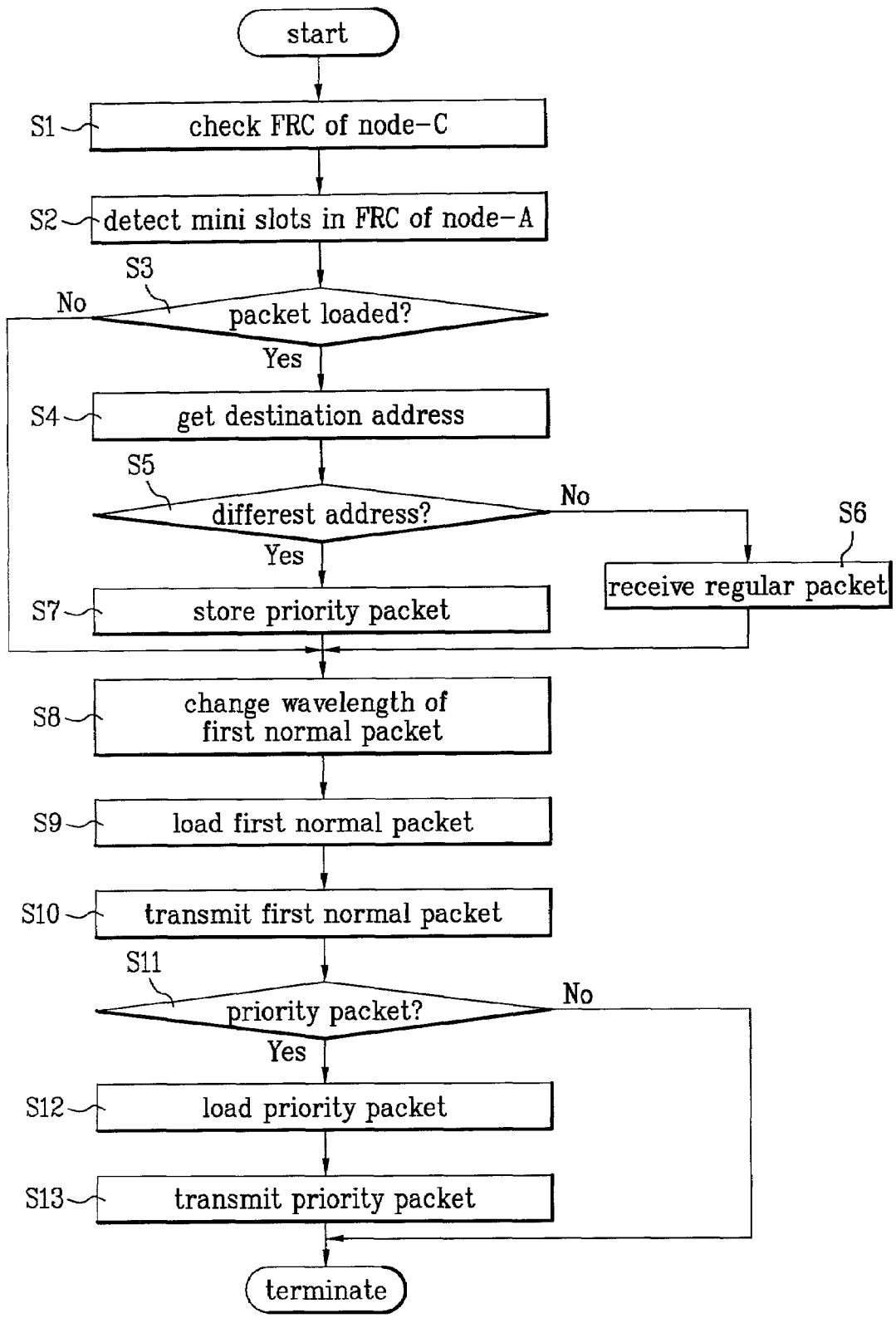
FIG. 3 illustrates a flow chart illustrating a method of transmitting a normal packet in a WDM based network system according to the present invention.

Reference will now be made in detail to a method of transmitting or receiving one or more data packets in WDM based network system of the present invention, examples of which are illustrated in FIG. 3. We will again assume that the node-A 51 and node-C 53 are a packet-transmitting node and a packet-receiving node, respectively. We will also assume that the channel 3 and channel 2 are used as the fixed packet-receiving channels of the nodes for the node-A 51 and node-C 53, respectively.

First of all, the WTR 63 of the node-A 51 determines whether there are any unoccupied (empty) mini slots that flow in the channel 2 fixed to the node-C 53 (S1). If it determines that they exist, the WTR 63 of the node-A 51 pass the unoccupied mini slots to the WTT 61 of the node-A 51.

One the other hand, the WFR 62 of the node-A 51 detects a set of mini slots, e.g., a1 to a2, that continuously flow in the channel 3, which is a fixed packet-receiving channel of node-A 51 (S2).

Thereafter the WFR 62 of the node-A 51 determines whether the detected mini slots (a1 to a2) are loaded with one or more packets (S3) If the WFR 62 determines that there are no packets loaded into the detected mini slots, it passes the detected mini slots to WTT 61 of the node-A, and the step S8 will be performed. This is described later in this section in more detail.

On the other hand, if the WFR 62 determines that the detected mini slots are loaded with one or more packets, the WFR 62 of the node-A 51 checks the destination address of each packet loaded in the detected mini slots (S4).

If the destination address of a loaded packet corresponds to the node-A 51, the WFR 62 of the node-A 51 receives the packet (S5 and S6). Otherwise, the WFR 62 receives the packet by unloading it from the mini slots and temporarily stores the received packet in the priority storage 65 (S7). Due to the steps S6 and S7, the mini slots that pass by the WFR 62 and flow to the WTT 61 are always unoccupied (empty).

Next, the WTT 61 of the node-A 51 tunes the wavelengths of a normal packet stored in the storage 64 to the wavelength of the channel 2, which is the fixed packet-receiving channel of the node-C 53 (S8). Then the WTT 61 sends the tuned normal packets to the node-C 53 by loading the tuned normal packet into the mini slots that flow in the channel 2 (S9 and S10).

As mentioned earlier, the WFR 62 of the node-A 51 receives not only the regular packets whose destination addresses are set to the node-A 51 but also the priority packets whose destination addresses are set to any other node. Therefore, the mini slots that pass the WFR 62 and flow to the WTT 61 are not occupied. Finally, the WFR 62 of the node-C 53 receives the normal packets by unloading them from the mini slots that flow in the channel 2.

After the step S10, the WTT 61 of the node-A 51 determines whether there is any priority packet, whose destination address is set to a node other than the node-A 51, stored in the priority storage 65 (S11). If there is no such packet, the WTT 61 terminates the packet transmission process.

However, if there is any priority packet stored in the priority storage 65, the WTT 61 transmits the priority packets by loading them into the mini slots that flow in the channel 3, which is the packet-receiving node of the node-A 51 (S12 and S13) Therefore, one or more priority packets can be transmitted before the next normal packet stored in the storage 64 is transmitted.

In conclusion, using the method of transmitting/receiving one or more packet in accordance with the present invention, the WDM based network system is able to avoid any collisions between the priority packets being unloaded and the normal packet. Therefore, the defects of the synchronous packet transmitting/receiving method are cured. The packet-receiving channel of a packet-receiving node can be set to a fixed wavelength, consequently, the problems of the prior art techniques are eliminated, and the efficiency of the whole network is greatly enhanced.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of transmitting a normal packet from a transmitting node having a first channel in a network system, said normal packet being transmitted to a receiving node having a second chanel, the method comprising the steps of:
   (a) detecting a first set of unoccupied mini slots that flow in said second channel;
   (b) checking a destination address of each of incoming packets loaded into a second set of mini slots that flow in said first channel, said incoming packets including at least one priority packet whose destination address is set to a node other than said transmitting node;
   (c) temporarily storing said at least one priority packet in a priority storage; and (d) transmitting said normal packet to said receiving node by loading said normal packet into said first set of unoccupied mini slots.

2. The method of claim 1 further comprising the step of (e) transmitting said at least one priority packet stored in said priority storage by loading said at least one priority packet into a third set of mini slots that flow in said first channel.

3. The method of claim 2, wherein said third set of mini slots flow in said first channel next to said second set of mini slots.

4. The method of claim 1, wherein said normal packet is tuned to said second channel before being loaded into said first set of unoccupied mini slots.

5. The method of claim 1 further comprising the step of receiving at least one regular packet included in said incoming packets, said at least one regular packet having its destination address set to said transmitting node.

6. A method of transmitting a normal packet from a transmitting node having a first packet-receiving channel in a network system, said normal packet being transmitted to a receiving node having a second packet-receiving channel, the method comprising the steps of:
   detecting a first set of unoccupied mini slots that flow in said second channel;
   detecting a second set of mini slots that flow in said first channel;
   checking a destination address of each incoming packet loaded into said second set of mini slots;
   receiving each regular packet from said second set of mini slots, said each regular packet having its destination address is set to said transmitting node;
   receiving each priority packet from said second set of mini slots, said each priority packet having its destination address is set to a node other than said transmitting node;
   temporarily storing each priority packet in a priority storage; and
   transmitting said normal packet to said receiving node by loading said normal packet into said first set of unoccupied mini slots.

7. The method of claim 6 further comprising the step of transmitting each priority packet stored in said priority storage by loading each priority packet into a third set of mini slots that flow in said first channel.

8. The method of claim 7, wherein said third set of mini slots flow in said first channel next to said second set of mini slots.

9. The method of claim 6, wherein said normal packet is tuned to said second channel before being loaded into said first set of unoccupied mini slots.

10. An apparatus of transmitting a normal packet from a transmitting node having a first channel in a network system, said normal packet being transmitted to a receiving node having a second channel, the apparatus comprising:
    a Wavelength Tunable Receiver (WTR) detecting a first set of unoccupied mini slots that flow in said second channel;
    a Wavelength Fixed Receiver (WFR) checking a destination address of each of incoming packets loaded into a second set of mini slots that flow in said first channel, said incoming packets including at least one priority packet whose destination address is set to said transmitting node;
    a priority storage temporarily storing said at least one priority packet; and
    a Wavelength Tunable Transmitter (WTT) transmitting said normal packet to said receiving node by loading said normal packet into said first set of unoccupied mini slots.

11. The apparatus of claim 10, wherein said WTT further transmits said at least one priority packet temporarily stored in said priority storage by loading said at least one priority packet into a third set of mini slots that flow in said first channel.

12. The apparatus of claim 11, wherein said third set of mini slots flow in said first channel next to said second set of mini slots.

13. The apparatus of claim 10, wherein said WTT tunes said normal packet to said second channel before loading said normal packet into said first set of unoccupied mini slots.

14. The apparatus of claim 10, wherein said WFR receives at least one regular packet included in said incoming packets, said at least one regular packet having its destination address is set to said transmitting node.

* * * * *